US009104677B2

(12) United States Patent
Koo

(10) Patent No.: US 9,104,677 B2
(45) Date of Patent: Aug. 11, 2015

(54) COMPREHENSIVE PIPELINE MANAGEMENT SYSTEM AND METHOD USING INFORMATION RECOGNITION MEANS

(75) Inventor: Seung Yub Koo, Gyeonggi-do (KR)

(73) Assignee: CHAHOO CO., LTD., Gyeonggi-Do (KR)

(*) Notice: Subject to any disclaimer, the term of this patent is extended or adjusted under 35 U.S.C. 154(b) by 106 days.

(21) Appl. No.: 13/883,074

(22) PCT Filed: Aug. 17, 2011

(86) PCT No.: PCT/KR2011/006029
§ 371 (c)(1),
(2), (4) Date: May 2, 2013

(87) PCT Pub. No.: WO2012/067337
PCT Pub. Date: May 24, 2012

(65) Prior Publication Data
US 2013/0221091 A1    Aug. 29, 2013

(30) Foreign Application Priority Data

Nov. 18, 2010 (KR) .................. 10-2010-0114962
Nov. 18, 2010 (KR) .................. 10-2010-0114965
Nov. 18, 2010 (KR) .................. 10-2010-0114966

(51) Int. Cl.
*G06F 17/00* (2006.01)
*G06F 17/30* (2006.01)
*G06Q 10/06* (2012.01)

(52) U.S. Cl.
CPC .... *G06F 17/30091* (2013.01); *G06F 17/30241* (2013.01); *G06Q 10/06* (2013.01)

(58) Field of Classification Search
CPC ................................. G01C 15/00; G06Q 10/08
USPC ........................................................ 235/375
See application file for complete search history.

(56) References Cited

U.S. PATENT DOCUMENTS 5,912,671 A * 6/1999 Oka .............................. 345/427
7,518,502 B2 * 4/2009 Austin et al. ............... 340/539.1
(Continued)

FOREIGN PATENT DOCUMENTS

KR 10-2006-0015900 A 2/2006
KR 10-2008-0035956 A 4/2008
(Continued)

*Primary Examiner* — Thien M Le
*Assistant Examiner* — Tae Kim
(74) *Attorney, Agent, or Firm* — Rabin & Berdo, P.C.

(57) ABSTRACT

Provided is a comprehensive pipeline management system using an information recognition means, the system including an integrated management server configured to generate an information recognition code using a serial number of a product related to water and sewer pipelines, and process storage and transmission of information related to the product and mapped to the information recognition code, an information recognition code printing terminal configured to print the information recognition code in a form attachable to the product, a user terminal configured to recognize the information recognition code from the product to which the information recognition code is attached, receive the product-related information mapped to the information recognition code from the integrated management server, output the received product-related information, generate location information and time information on the product received through a Global Positioning System (GPS) satellite, and transmit the generated location information and time information to the integrated management server, an authentication server configured to, when there is a request for information related to water and sewer pipelines from the user terminal to the integrated management server, authenticate authority of the user terminal, and a database (D/B) server configured to map and store the information recognition code and the product-related information, provide the stored information in response to the request for information on the product from the user terminal, and update and store the product-related information when the location information and the time information on the product is received from the integrated management server.

17 Claims, 11 Drawing Sheets

(56) References Cited

U.S. PATENT DOCUMENTS

| | | |
|---|---|---|
| 8,219,558 B1* | 7/2012 | Trandal et al. ................. 707/736 |
| 2006/0106917 A1* | 5/2006 | Lambourn et al. ............. 709/217 |
| 2008/0150727 A1* | 6/2008 | Hatori et al. ................ 340/572.8 |
| 2008/0252449 A1* | 10/2008 | Colvero et al. ................. 340/540 |
| 2010/0106645 A1* | 4/2010 | Peckover ......................... 705/50 |
| 2010/0295943 A1 | 11/2010 | Cha et al. |
| 2011/0009092 A1* | 1/2011 | Etchegoyen .................. 455/411 |

FOREIGN PATENT DOCUMENTS

| | | |
|---|---|---|
| KR | 10-2008-0069639 A | 7/2008 |
| KR | 10-2009-0004326 A | 1/2009 |
| KR | 10-2010-0005420 A | 1/2010 |
| KR | 10-2010-0116871 A | 11/2010 |

* cited by examiner

US 9,104,677 B2

COMPREHENSIVE PIPELINE MANAGEMENT SYSTEM AND METHOD USING INFORMATION RECOGNITION MEANS

TECHNICAL FIELD

The present invention relates to a comprehensive pipeline management system, and more particularly, to a comprehensive pipeline management system and method using an information recognition means, such as a barcode or a quick response (QR) code, augmented reality, and the Global Positioning System (GPS).

BACKGROUND ART

In general, a pipeline is separated into pipes and connectors (for connecting a pipe with another pipe), and its use varies according to a material used therein. When pipelines are used to transport materials, for example, clear water, sewage, gas, and oil, they can be referred to as water pipes, sewer pipes, gas pipes, and oil pipes, respectively.

Meanwhile, sewage denotes waste water, rainwater, industrial sewage, etc., and sewerage denotes the whole of pipes (sewer pipelines) and other structures and facilities (a pipeline, an additional facility, a sewage treatment facility, and a pump facility for supplementing them) installed to exclude or process waste water and rainwater. The sewerage consists of a collection and drainage facility in which waste water and rainwater flows and is collected, a sewage treatment facility in which the waste water and rainwater flows through the collection and drainage facility, a discharge and disposal facility in which the waste water and rainwater flows through the sewage treatment facility, and a sewer pipeline that connects these facilities to transport the waste water and rainwater.

Current management of most pipelines including water and sewer pipelines only maintains a design drawing after sales and installation, and confirmation and management of actual construction is not being performed well. In other words, it may be impossible to accurately check information on products related to pipelines such as production dates, manufacturers, and conditions, and also no one except a person who purchased the products may be able to know whether or not the products used in construction are recycled products or whether or not the products are used products.

In addition, there are not enough systems capable of accurately managing stocks, movement paths, and storage conditions of products, and it is not possible to know whether or not a design drawing corresponds to actual construction locations and specifications. Thus, without digging at the corresponding location, it is impossible to check this.

There is a great demand for systems in which such information can be readily input and checked, but thus far, no system has properly supported these functions. Also, when a system capable of managing such information is combined with Global Positioning System (GPS) information, etc., the accuracy and expansibility of the corresponding information can be remarkably improved, and thus there is an urgent need for a comprehensive management system for pipelines used to transport gas, oil, etc. as well as water and sewage.

DISCLOSURE

Technical Problem

The present invention is directed to providing a comprehensive pipeline management system and method using an information recognition means capable of effectively and actively managing pipelines by constructing a database (D/B) and a system capable of integrated management of pipelines.

The present invention is also directed to providing a comprehensive pipeline management system and method using an information recognition means capable of integrated management of pipelines by attaching an information recognition means such as a barcode or a quick response (QR) code to each product to be managed.

The present invention is also directed to providing a comprehensive pipeline management system and method using an information recognition means capable of obtaining various information using an information recognition means such as a barcode or a QR code installed on a product, and checking whether or not construction information corresponds to a design drawing by storing the various information and the construction information in a D/B.

The present invention is also directed to providing a comprehensive water and sewer pipeline management system and method using augmented reality capable of displaying information related to buried water and sewer pipelines using augmented reality and enabling intuitive use of the information.

The present invention is also directed to providing a comprehensive water and sewer pipeline management system and method using augmented reality capable of giving access authority to a D/B in which integrated management information on water and sewer pipelines is stored, and controlling the use of information in real time.

The present invention is also directed to providing a comprehensive water and sewer pipeline management system and method using coordinate calculation based on a wireless local area network (LAN) capable of calculating an accurate location at which water and sewer pipelines are installed according to a relative coordination measurement method using a wireless LAN.

Technical Solution

One aspect of the present invention provides a comprehensive pipeline management system using an information recognition means, the system including: an integrated management server configured to generate an information recognition code using a serial number of a product related to water and sewer pipelines, and process storage and transmission of information related to the product and mapped to the information recognition code; an information recognition code printing terminal configured to print the information recognition code in a form attachable to the product; a user terminal configured to recognize the information recognition code from the product to which the information recognition code is attached, receive the product-related information mapped to the information recognition code from the integrated management server, output the received product-related information, generate location information and time information on the product received through a Global Positioning System (GPS) satellite, and transmit the generated location information and time information to the integrated management server; an authentication server configured to, when there is a request for information related to water and sewer pipelines from the user terminal to the integrated management server, authenticate authority of the user terminal; and a database (D/B) server configured to map and store the information recognition code and the product-related information, provide the stored information in response to the request for information on the product from the user terminal, and update and store the product-related information when the location information and the time information on the product is received from the integrated management server.

Here, a dedicated application for interpreting the identified information recognition code and performing a function of requesting information from the corresponding linked uniform resource locator (URL) may be installed in the user terminal, and an image of the product related to water and sewer pipelines and installed in the corresponding area may be displayed as augmented reality to overlap an actual image taken through a camera included in the user terminal.

Here, the comprehensive pipeline management system may further include at least three wireless signal transmission devices installed in an area in which the product is buried, and the location information may be generated by measuring and calculating three-dimensional (3D) coordinates of points at which the respective devices are installed with respect to one of the at least three wireless signal transmission devices, determining relative coordinate values of a construction point on the basis of the calculated 3D coordinates, and calculating actual absolute coordinates upon the construction from absolute coordinates of the wireless signal transmission device that is the reference and the calculated relative coordinate values.

Here, the target to which the information recognition code is attached may be at least one selected from among a pipe, a pipe-related component, a manhole, a design drawing, and a major point.

Here, the information recognition code may be at least one selected from among a barcode, a quick response (QR) code, a smart tag, a data matrix, and a color zone improvement plan (ZIP) code.

Here, the authority of the user terminal may be differentially set according to an ordinary person, a builder, a designer, an inspector, and a sales manager.

Here, the user terminal may additionally display the corresponding information recognition code generated for the product related to water and sewer pipelines on the augmented-reality image of the product, and display the detailed information on the product stored in the D/B server when the displayed information recognition code is selected.

Another aspect of the present invention provides a method of comprehensively managing pipelines using the above-described integrated management server, user terminal, information recognition code printing terminal, and D/B server, the method including: a first step of generating, at the integrated management server, an information recognition code using identification information on a product related to water and sewer pipelines, information related to the product related to water and sewer pipelines being mapped to the information recognition code and present in the D/B server; a second step of printing, at the information recognition code printing terminal, the generated information recognition code in an attachable form, the printed information recognition code being attached to the water and sewer pipelines; a third step of recognizing the information recognition code attached to the water and sewer pipelines through the user terminal; a fourth step of generating and transmitting, at the user terminal, location information and time information on the product to the integrated management server; and a fifth step of receiving, at the D/B server, the location information and the time information on the product from the integrated management server, and updating the product-related information according to the received time information and time information, wherein the integrated management server authenticates authority of the user terminal and then transmits the product-related information to the user terminal after the third step or the fifth step.

Here, a dedicated application for interpreting the identified information recognition code and performing a function of requesting information from the corresponding linked URL may be installed in the user terminal, an image of the product related to water and sewer pipelines and installed in the corresponding area may be displayed as augmented reality to overlap an actual image taken through a camera included in the user terminal, the corresponding information recognition code generated for the product related to water and sewer pipelines may be additionally displayed on the augmented-reality image of the product, and the detailed information on the product stored in the D/B server may be displayed when the displayed information recognition code is selected.

Here, the fourth step of generating the location information may include: a 4-$1^{st}$ step of measuring and calculating 3D coordinates of points at which at least three respective wireless signal transmission devices are installed in an area in which the product is buried, with reference to one of the at least three wireless signal transmission devices, a 4-$2^{nd}$ step of determining relative coordinate values of a construction point on the basis of the calculated 3D coordinates, and a 4-$3^{rd}$ step of calculating actual absolute coordinates upon the construction from absolute coordinates of the wireless signal transmission device that is the reference and the calculated relative coordinate values.

Advantageous Effects

According to the present invention, an expanded recognition code enables a manufacturer to rapidly collect data of a product and efficiently manage the product. Also, since it is possible to know basic information on the product by only reading expansive information in the recognition code, fraud on product information such as a production date, a condition and the manufacturer of the product is prevented, and efficient quality management is achieved.

When a recognition code is read upon construction, Global Positioning System (GPS) location information and time information is stored in connection with product information. Thus, it is possible to automatically input and manage construction information, check whether or not the construction information corresponds to a design drawing, and also easily use the construction information in maintenance later.

In addition, it is possible to develop and supply a comprehensive management terminal for a site and a barcode generation/attachment device, and a real-time product management system can be implemented at the site on the basis of the comprehensive management terminal and the barcode generation/attachment device. Also, it is possible to control the amount and level of information to be disclosed according to authority, and ordinary persons are provided with basic information permitted to be provided and enabled to use the information.

Further, it is possible to intuitively know a location at which construction has been performed and information on a product through augmented-reality technology based on the GPS, and also effectively perform comprehensive construction management as well as maintenance.

Furthermore, access authority to a database (D/B) in which integrated management information on water and sewer pipelines is stored is given, so that the amount and level of information to be disclosed can be controlled according to authority, and ordinary persons also can be provided with basic information and use the information according to a level of information to be provided.

Additionally, relative coordinates are calculated using a wireless local area network (LAN), and absolute coordinate information is obtained from the relative coordinates, so that highly precise location information can be used for installation and management of water and sewer pipelines.

MODES OF THE INVENTION

Figure 1:
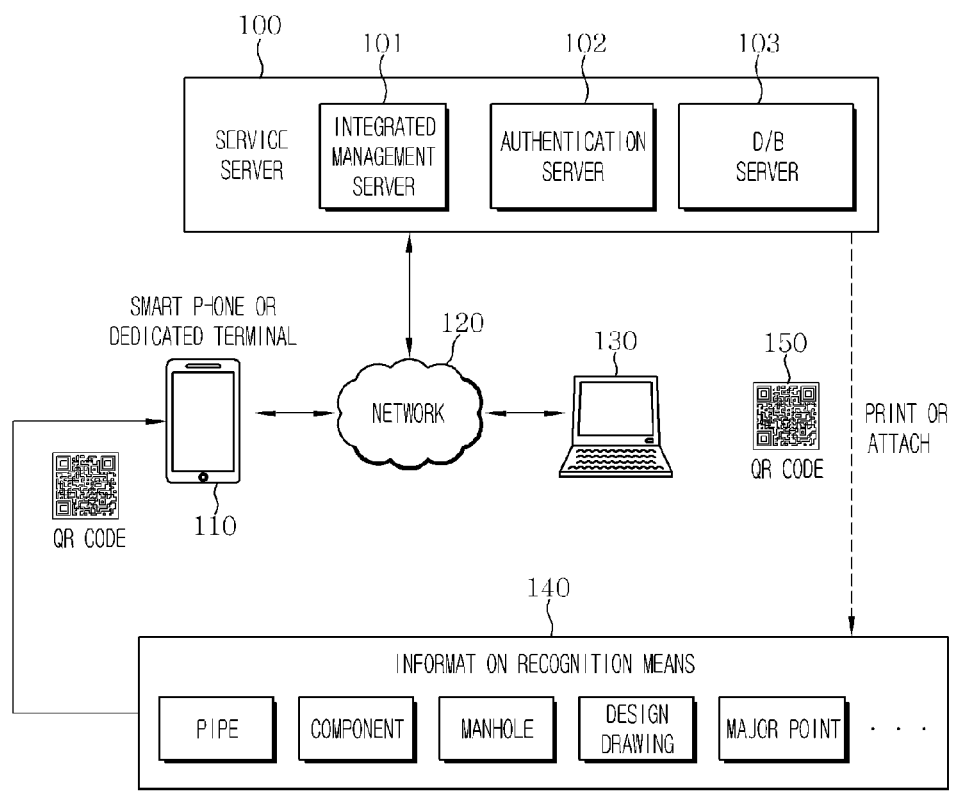
FIG. 1 is a diagram of a comprehensive pipeline management system using an information recognition means to which the present invention is applied.

The present invention proposes a comprehensive pipeline management system and method using an information recognition means capable of effectively and actively managing pipelines by constructing a database (D/B) and a system capable of integrated management of pipelines.

In other words, information recognition means (e.g., a barcode, a quick response (QR) code, a color zone improvement plan (ZIP) code, a smart tag, and a data matrix) are implanted into respective products constituting a pipeline. Basic information on the products can be easily obtained through the information recognition means, and is used to manage the products. Information recognition means applied to the present invention can be configured in a one-, two-, three-, etc. dimensional form of a code or an image. Thus, not only the aforementioned types of codes but also any other codes performing similar functions can be applied to the present invention.

Meanwhile, a means (e.g., a serial number) capable of accessing a space in which a uniform resource locator (URL) of each product or information similar to the URL will be provided is provided in information in a pattern of an information recognition means, so that a detailed history and construction information on the product can be immediately checked. At this time, the space in which the URL or information similar to the URL will be provided is automatically generated in connection with a DB upon code generation.

In addition, in the present invention, an information recognition means installed in a product is used to read information such as a type and use of the product and a pipe direction, and information on a time and location at which the product is buried and a person directly involved in input of the information is added and grafted to a design drawing.

The term "pipeline" used in the description of the present invention denotes pipes and components for connecting the pipes with each other. The present invention is not limited to management of pipes, and includes management of components and other stuffs necessary to install the pipes.

In addition, pipelines are being used in various fields including gas, oil, etc. as well as water and sewage, and the present invention can be applied to any fields and purposes in and for which a pipeline is installed.

Further, a system capable of displaying comprehensive information related to water and sewer pipelines using augmented reality implemented in a smart phone and intuitively using the comprehensive information according to an exemplary embodiment of the present invention is provided, and it is also possible to connect the comprehensive information with a design drawing.

Furthermore, in an exemplary embodiment of the present invention, when highly precise location information is necessary, relative coordinates are obtained using a wireless local area network (LAN), and it is possible to use accurate absolute location information. In other words, a reference point is set using a wireless LAN or a signal (radio wave) generation device that can be used as a reference for location recognition, relative coordinates are recognized and recorded on the basis of the reference point, and then all absolute coordinate information calculated from the relative coordinates is stored in a D/B and enabled to be loaded, so that the reference point of coordinates and accurate location information can be used by simply reading the stored information.

Meanwhile, in another exemplary embodiment of the present invention, access authority to a D/B in which comprehensive information related to water and sewer pipelines is stored is given differentially according to users, and security can be strengthened using a unique device identifier (UDID), login, information encryption, and various other methods. Accordingly, the use of information can be controlled in real time.

In the present invention, description will be made using a QR code as an example of an information recognition means attached to or printed on each product. However, the present invention is not limited to a QR code, and a barcode, a QR code, a color ZIP code, a smart tag, a data matrix, and any means capable of performing functions similar to or the same as functions of these can be used.

The present invention has the following characteristics.

1. A D/B and URLs (or a window for providing information such as a URL) are automatically generated on the basis of identification information (e.g., serial numbers) on products, recognition codes are generated on the basis of the D/B and the URLs, and service is provided via the Internet using a smart phone.

2. Two-dimensional (2D) recognition codes (such as QR codes) containing information therein or one-dimensional (1D) recognition codes (barcodes) that can be used to access product information are put on the products, and information is collected by recognizing the recognition codes through a terminal including a smart phone and transmitting the information via a wireless LAN.

3. Characteristics of the products are checked using the recognized information, and the recognized information is combined with GPS information to track delivery routes of the products, find the number of the products, and store actual construction locations, front and rear directions of pipes, connection states, and so on.

4. By connecting the information stored in item number 3 above with a design drawing, depth information that cannot be found using the GPS is found, and the design and an actual construction state are compared and analyzed (when a differentiation has been made according to layers).

5. The recognition codes connected with the product information are printed on, attached to, or virtually operate in connection with the design drawing for use.

6. Product specifications, construction details, the recognition codes, or other processed necessary information is directly displayed on an actual map, a graphic information system (GIS), etc. on the basis of the information stored in item number 3 above, or directly displayed on a screen of a device (e.g., a dedicated terminal or a smart phone) using augmented reality.

7. A unique device terminal number (UDID, mobile equipment identity (IMEI), etc.), a unique address generated from a serial number, and a value stored in a server are set as a personal key, a public key, and a security key respectively, and individual-specific access authority and levels of information to be disclosed are controlled using the keys.

8. When highly precise location information is necessary, a reference point is set using a wireless LAN or a signal (radio wave) generation device that can be used as a reference for location recognition, and relative coordinates are recognized and recorded on the basis of the reference point 9. All absolute coordinate information calculated from the relative coordinates is stored in the D/B and enabled to be loaded, so that the reference point of coordinates and accurate location information can be used by simply reading the stored information.

Hereinafter, exemplary embodiments of the present invention will be described in detail with reference to the accompanying drawings. In describing the present invention, when detailed description of a well-known technology or an element relating to the present invention may unnecessarily make the spirit of the present invention unclear, the detailed description will be omitted FIG. 1 is a diagram of a comprehensive pipeline management system using an information recognition means according to an exemplary embodiment of the present invention. Referring to FIG. 1, the comprehensive pipeline management system according to an exemplary embodiment of the present invention may include a service server 100, a smart phone 110, a network 120, a user terminal 130, a code identification target 150, an information recognition means 140, and so on. The service server 100 includes an integrated management server 101, an authentication server 102, a D/B server 103, and so on.

First, serial numbers of products given when the products are produced, product information, etc. are stored in the D/B server 103, and the integrated management server 101 generates information recognition means 150 such as QR codes using the stored information. The generated information recognition means 150 are printed on or attached to the corresponding products and then buried. Here, code identification targets to which the information recognition means 150 are attached may be a manhole, a design drawing, a major point, etc. as well as pipes and the corresponding components necessary for pipelines.

Meanwhile, a builder uses the smart phone 110 or a dedicated terminal on the corresponding code identification target to which an information recognition means 150 is attached, thereby scanning the information recognition means 150. When the information recognition means, for example, a QR code, is scanned, the corresponding code is analyzed, and information mapped to the corresponding code is displayed, or the corresponding information is requested from the integrated management server 101 via the network 120 using a URL address linked with the corresponding code.

In response to the request, the integrated management server 101 checks the URL address, etc., extracts the corresponding mapped information from the D/B server 103, and provides the extracted information to the smart phone 110. Here, the provided information includes various types of previously input information on the code identification target, for example, a pipe, to which the corresponding information recognition means 150 is attached. For example, the provided information may be information on a type of a product, a use, a direction of a pipe, a construction time, a construction location, a person directly involved in input of the information, and so on.

Meanwhile, when the builder scans a QR code attached to the corresponding product while burying the corresponding product, GPS location information, time information, etc. may be automatically stored in the D/B server 103 in connection with product information. In other words, at a scanning point in time, the smart phone 110 receives location information from a GPS satellite, and transmits the received location information and time information to the integrated management server 101 together with the scanned product information, so that the location information, the time information, and the product information is stored in the D/B server 103. In this way, accurate construction information can be readily input and managed, and can also be readily used for maintenance later.

Figure 2:
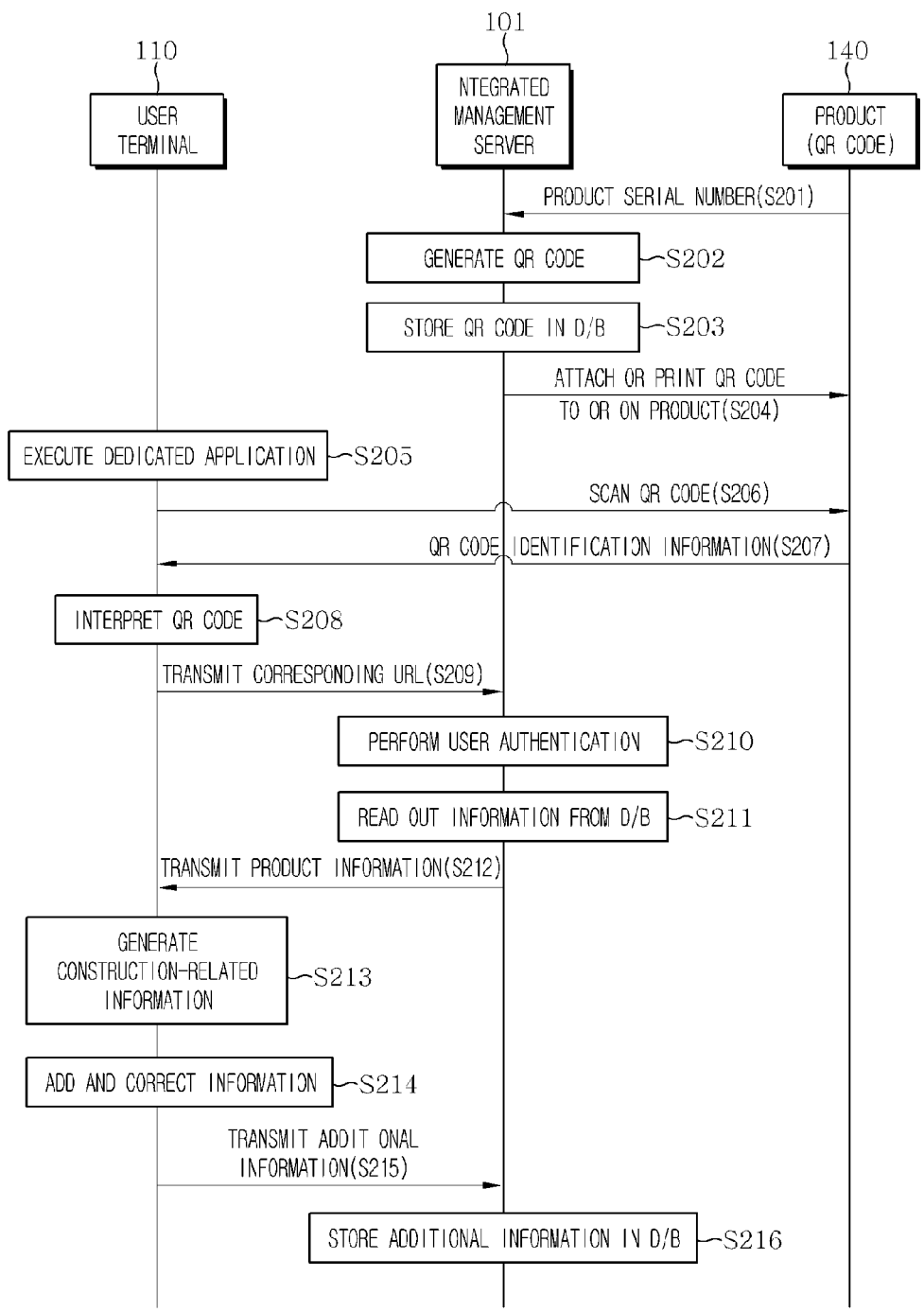
FIG. 2 is a flowchart illustrating a comprehensive pipeline management procedure using an information recognition means to which the present invention is applied.

FIG. 2 is a flowchart illustrating a comprehensive pipeline management procedure using an information recognition means according to an exemplary embodiment of the present invention. Referring to FIG. 2, first, an integrated management server 101 generates a QR code using a product serial code of a code identification target, for example, a product 140 (S201 and S202). The generated QR code information is stored in a D/B (S203). Here, the generated QR code is output and attached to or printed on the corresponding product (S204), so that comprehensive management of the product is performed.

A user terminal 110 executes a dedicated application upon construction (S205), and scans the QR code in the product 140 (S206). The scanned QR code identification information (S207) is interpreted by the dedicated application (S208), and information on the corresponding product is output, or information is requested from the corresponding URL in which detailed information on the product is stored (S209). Here, when another method is implemented by a terminal dedicated to performing the present invention rather than a general smart phone as mentioned above, the process may be performed not by the dedicated application but by an optimized web service, a program that can be used by the dedicated terminal, or a means similar to the program.

The integrated management server 101 performs user authentication on a user in response to the information request (S210). When the user has an authorized right, the integrated management server 101 reads out information on the corresponding product from the D/B (S211), and transmits the information to the user terminal 110 of the user (S212). As described above, according to an exemplary embodiment of the present invention, construction-related information (e.g., location information in the GPS and time information) is automatically generated (S213), and the automatically generated information and added and corrected information on the product (S214) is transmitted to the integrated management server 101 (S215). The integrated management server 101 stores the received additional information and construction-related information in the D/B (S216)

Figure 3:
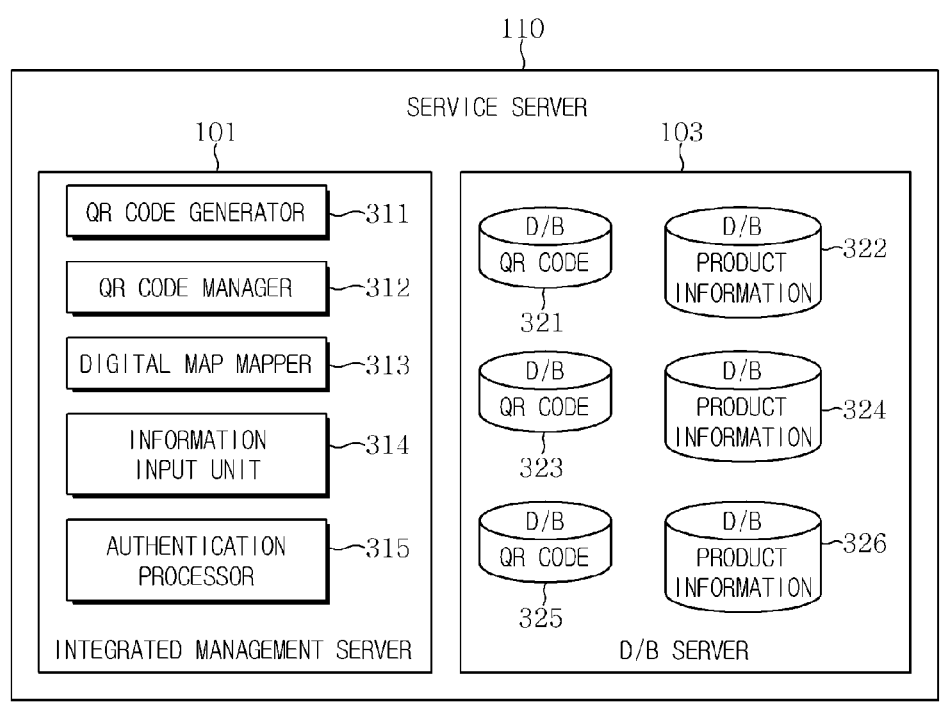
FIG. 3 is a diagram showing a detailed constitution of a service server to which the present invention is applied.

FIG. 3 is a diagram showing a detailed constitution of a service server according to an exemplary embodiment of the present invention. Referring to FIG. 3, an integrated management server 101 may include a QR code generator 311, a QR code manager 312, a digital map mapper 313, an information input unit 314, and an authentication processor 315. Also, a D/B server 103 may include D/Bs of QR code information 321, product information 322, delivery information 323, sales information 324, design information 325, construction information 326, and so on.

The QR code generator 311 functions to generate a QR code using a serial number, etc. of each product. The QR code manager 312 functions to store various information on a product mapped to the corresponding QR code in a D/B and correct the information. The digital map mapper 313 functions to, when a product to which the corresponding QR code is attached is buried and installed, map and display the corresponding construction location information on a digital map. The information input unit 314 functions to receive product-, construction-, delivery-, and sales-related information, etc. input through a user terminal, a smart phone, etc. The authentication processor 315 functions to scan the QR code through a smart phone, etc. and thereby process user authentication through an authentication server, etc. when data of the corresponding product is requested.

Figure 5:
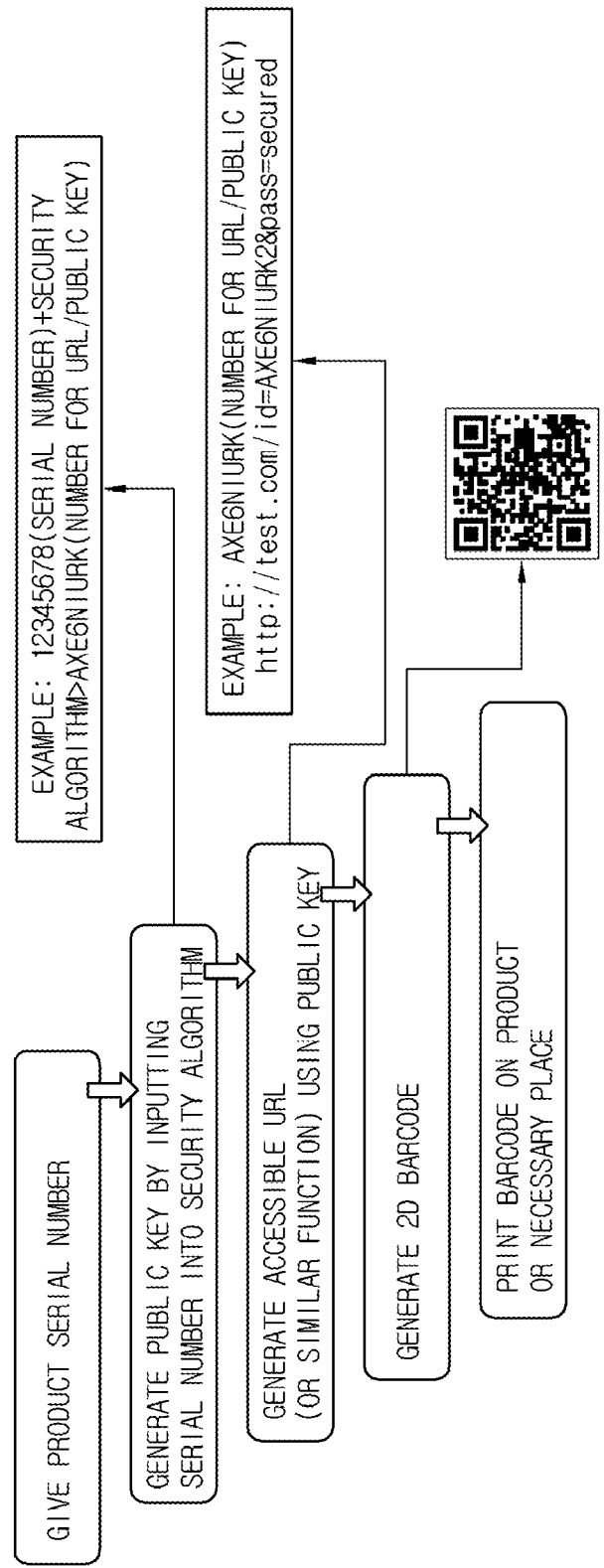
FIG. 5 is a diagram illustrating a quick response (QR) code generation process to which the present invention is applied.

With reference to FIG. 5, a method of generating a D/B, a URL, and an information recognition code on the basis of a production serial number of a product will be described below.

First, D/B data is created using a serial number of a product given upon production of the product and product information, and simultaneously a URL (or a similar function) for providing service connected with the corresponding D/B is created.

At this time, all or a part of a value is modulated through an encryption algorithm, and it is impossible to know the serial number of the product from the information alone. The corresponding value becomes a primary security means for preventing access through a forced input of a random serial number, etc., and makes access to the corresponding page impossible unless a correct URL or a value according to the URL is obtained.

Also, the corresponding value serves as a public key and can be used in a security procedure, etc. later. After such processes are performed at the same time, a 2D recognition code containing basic information on the product and an accessible URL or a 1D recognition code that can be used for accessing the URL is generated. The generated information recognition code is attached to or printed on an object or a place in need of management and used as mentioned above.

Figure 6:
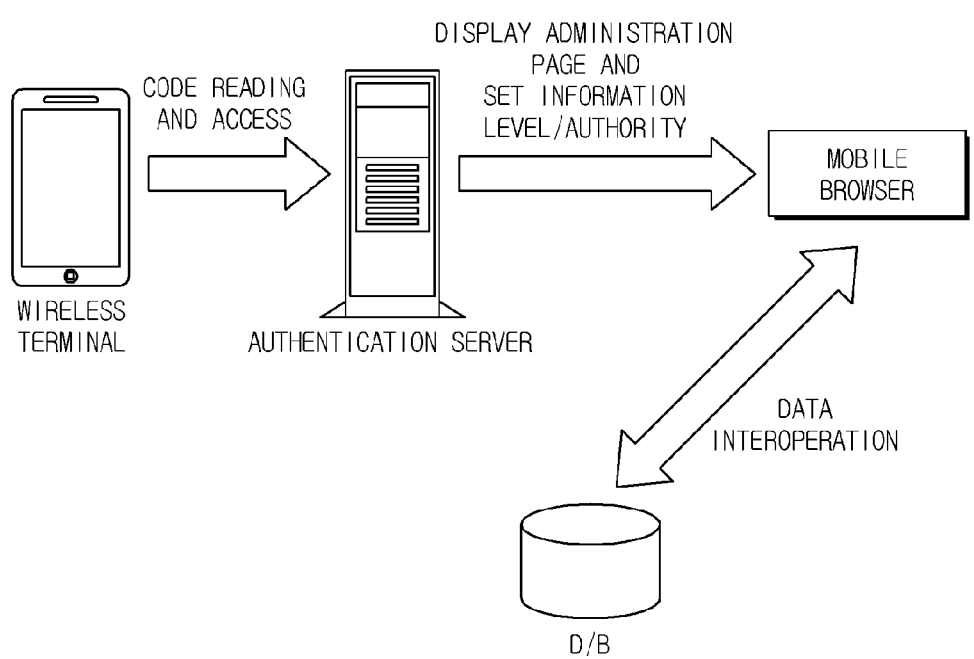
FIG. 6 is a conceptual diagram of a system to which the present invention is applied.

With reference to FIG. 6, a method of collecting and managing information using a barcode put on a product will be described below.

As mentioned above, basic information on a product and a URL serving as a public key are put on a 2D barcode. A smart phone capable of reading a code recognizes the 2D barcode, and then gains access using a wired or wireless information network, thereby collecting and managing information on the corresponding product.

When security is authenticated (using a dedicated terminal, an application dedicated to a smart phone including an authentication function, and so on), it is supported to enable information collection and management using a public key alone even without accessing the corresponding URL or a similar function. A terminal of which security is not authenticated (e.g., a smart phone) is caused to access the corresponding URL or the similar function and use an information collection and management function, and a right and a level of information are determined through security authentication.

Here, collected information is stored in a D/B. The present invention can be applied to fields of production management, delivery management, sales management, construction management, etc., and it can be supported to enable comprehensive management by combining production management, delivery management, sales management, construction management, etc. with an existing system such as a production automation system or enterprise resource planning (EPR).

Figure 7:
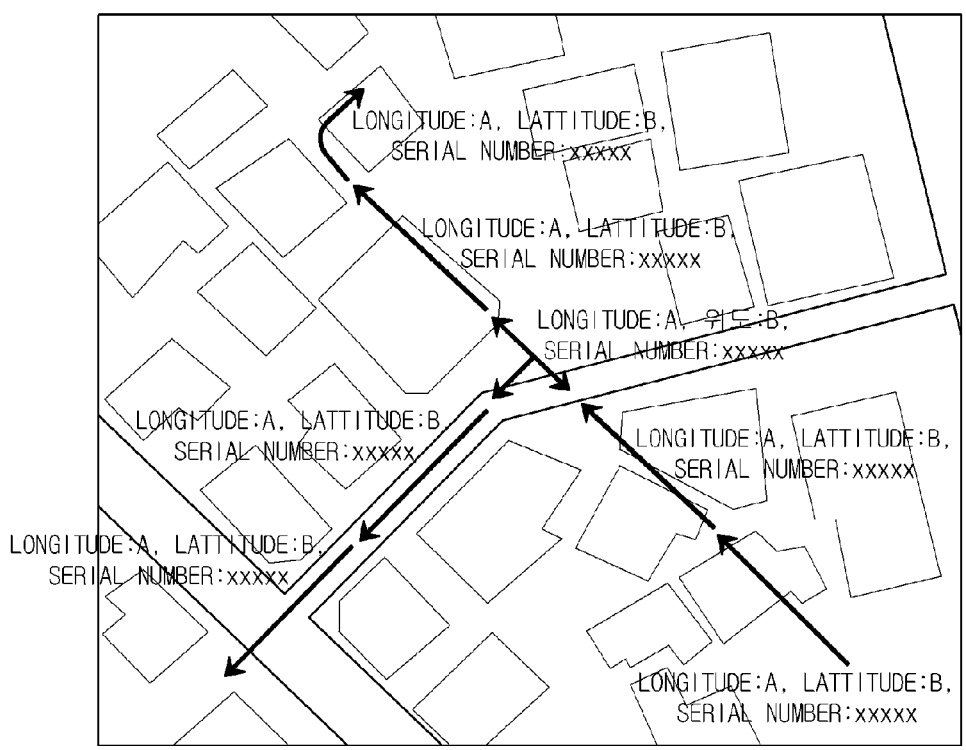
FIG. 7 is a diagram showing an example of use of a comprehensive management system to which the present invention is applied.

Next, a method of generating processed information using information such as a location, a time, and a user will be described with reference to FIG. 7.

Almost all mobile terminals including a smart phone have embedded devices capable of recognizing and using time and a location. When a recognition code is recognized, such information is simultaneously collected, and processed information is generated. In particular, by checking and recording a location and a time at which a product is used upon construction and information on the product itself, it is possible to improve an existing brute-force approach in which a check is impossible without digging.

In addition, connection directions, connection states, and other characteristics of pipes and other products are defined using characteristics (a straight pipe, a cross pipe, a Y-shaped pipe, a T-shaped pipe, a connector, a valve, and others) of the respective products, and used to obtain accurate information on an actual construction state when an input is made through recognition of a recognition code. Such information can be collected/stored in a D/B, systematized, and used for management later. In addition to this, such information can also be applied to tracking a delivery route, measuring a storage location and a storage period, and distribution management.

Meanwhile, when construction has been completed, related art depends on a design drawing alone. However, the design drawing does not correspond to an actual construction state, and cases in which it is impossible to know an actual construction state without digging frequently occur. When construction information is accurately checked using the above-described method, this problem can be solved. Thus, by comparing location information obtained upon construction with an actual design drawing and displaying the location information and the design drawing, it is possible to provide information more effectively. Also, with a design drawing by actual measurement rather than a map checked in person, information can be input through code recognition.

Here, it is impossible to obtain information on a depth (or height) from the GPS, and this problem is solved by obtaining depth information in connection with a design drawing separated in layer units. Finally, information is generated by separating respective components as unit modules upon design, and it is supported to enable a direct combination between the generated information and construction information obtained through actual barcode recognition.

A print, attachment, or virtual interoperation method of a recognition code connected with product information will be described below.

Using a printing device that can be connected with a portable terminal, etc. and immediately used, a recognition code of a component that has been buried normally is stored in a server and printed at the same time, so that the printed recognition code can be immediately attached to a design drawing, a manhole, and a major point according to necessity.

In another method, a recognition code is directly put in a design drawing file as soon as it is recognized, and can be output or stored as it is in the file state to be used in a design management and maintenance process. Also, the recognition code is stored in a server, so that a person in need of it can handly manage a construction state in person.

In this way, when an attached/recorded recognition code is recognized by another terminal, anyone can obtain the same result as recognizing a recognition code actually attached to the corresponding component, and use the recognition code for management and maintenance according to authority.

A comprehensive pipeline management system using an information recognition means to which the present invention is applied has been described above, and a comprehensive pipeline management system using augmented reality and an authority-based D/B access and user authentication method will be described below with reference to FIG. 8 and FIG. 10 according to an exemplary embodiment of the present invention.

Figure 8:
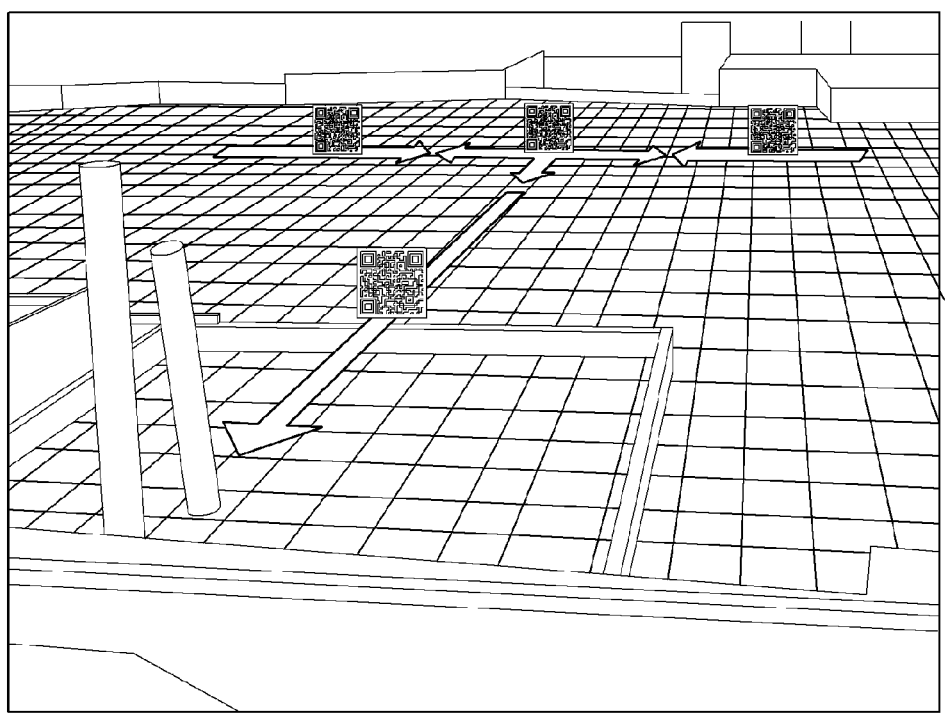
FIG. 8 is a diagram showing an example of displaying augmented reality through a smart phone according to an exemplary embodiment of the present invention.

FIG. 8 is a diagram showing an example of displaying augmented reality through a smart phone according to an exemplary embodiment of the present invention. As mentioned above, types, conditions, construction locations and directions, depths, etc. of products can be displayed on a general map, a design map, a GIS, etc. on the basis of information stored for comprehensive management of pipelines such as water and sewer pipelines. Here, as the displayed content, all related information such as recognition codes, product summary information, and conditions can be selectively used on the basis of expediency.

Referring to FIG. 8, using an augmented-reality function that can be implemented by a portable terminal (e.g., a smart phone), a dedicated terminal, etc., information related to water and sewer pipelines at a location that a user currently looks at through a camera can be three-dimensionally displayed, and the user can readily find actual locations at which water and sewer pipelines have been buried using the displayed information.

For example, an installation location, direction, etc. of a pipe can be shown to overlap an actual camera screen shown on a screen of the corresponding portable terminal. Also, an image such as each information recognition means (e.g., a QR code) generated as described above is displayed together on the corresponding pipe or component. At this time, by selecting each QR code, various information including production information and construction information on the corresponding product can be additionally displayed. In other words, when the user selects information displayed on the screen, it is possible to provide a result of recognizing a recognition code corresponding to the corresponding product, or additional information in case of need.

Meanwhile, when information on a depth of the corresponding product has been additionally included as mentioned above, the depth can also be displayed on the basis of the information. In other words, although it is impossible to know an absolute height of the user, a relative height can be calculated using the information on the depth, and thus the information can be used in a 3D display.

Figure 10:
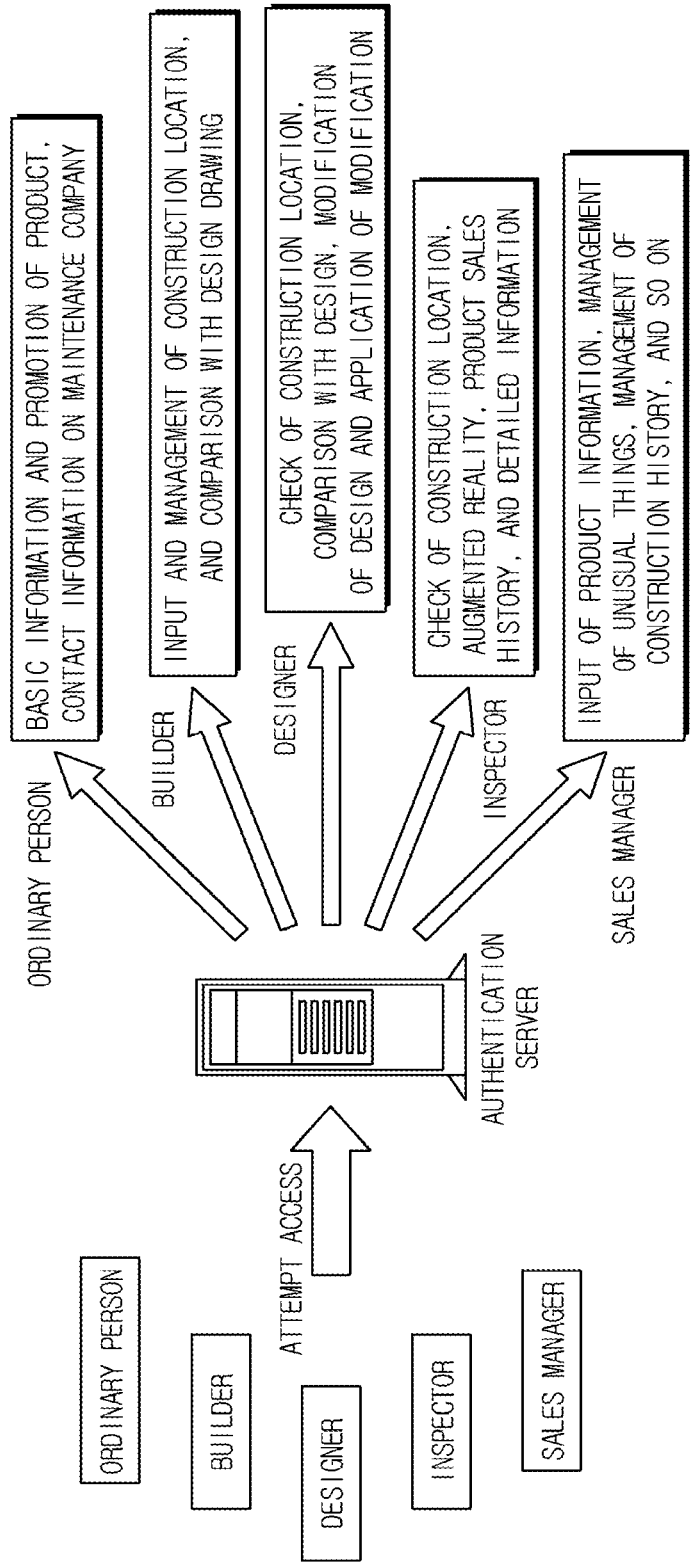
FIG. 10 is a diagram showing examples of use of an authentication system according to an exemplary embodiment of the present invention.

FIG. 10 is a diagram showing examples of use of an authentication system according to an exemplary embodiment of the present invention. A general information recognition means (e.g., a QR code) has a drawback that any third person having a code reader can check information using the code reader. However, among information on water and sewer pipelines, there may be information that should be secured according to the laws and regulations of a country.

Thus, by checking a modulated URL generated from a serial number of a product, etc., a unique device number of a portable terminal, and a unique value registered with a server, it is possible to authenticate whether the corresponding user is a registered person, and what kind of authority the user has. In other words, to use the system, a unique device number should be registered, and authority to use the system should be given.

According to checked authority of respective users such as a simple check, production information, supply information, input of construction information, and maintenance, a screen varies upon access to a URL or access of a dedicated terminal, and thus it is possible to prevent infringement of users' authority, unnecessary disclosure of information, and so on.

Meanwhile, a general user having no authority can be provided with additional service such as basic description of the corresponding product and connection to information on company and product promotion, and so on.

In other words, referring to FIG. 10, it is preferable to give a general user authority to browse only basic information on a product, promotion of the product, and contact information on a maintenance company, and when a user is confirmed as a builder, it is preferable to enable the builder to input and manage a construction location and browse a design drawing.

In addition, in the case of a designer, it is preferable to set authority to check a construction location, make a comparison with a design, modify a design, and apply the modification, and in the case of an inspector, it is preferable to set authority to check a construction location, augmented reality, a product sales history, and detailed information. Also, in the case of a sales manager, it is preferable to set authority to input product information, manage unusual things, manage a construction history, and so on.

A highly precise location measurement method necessary for accurate water and sewer system construction and management will be described below with reference to FIG. 4 and FIG. 9 according to an exemplary embodiment of the present invention.

Figure 4:
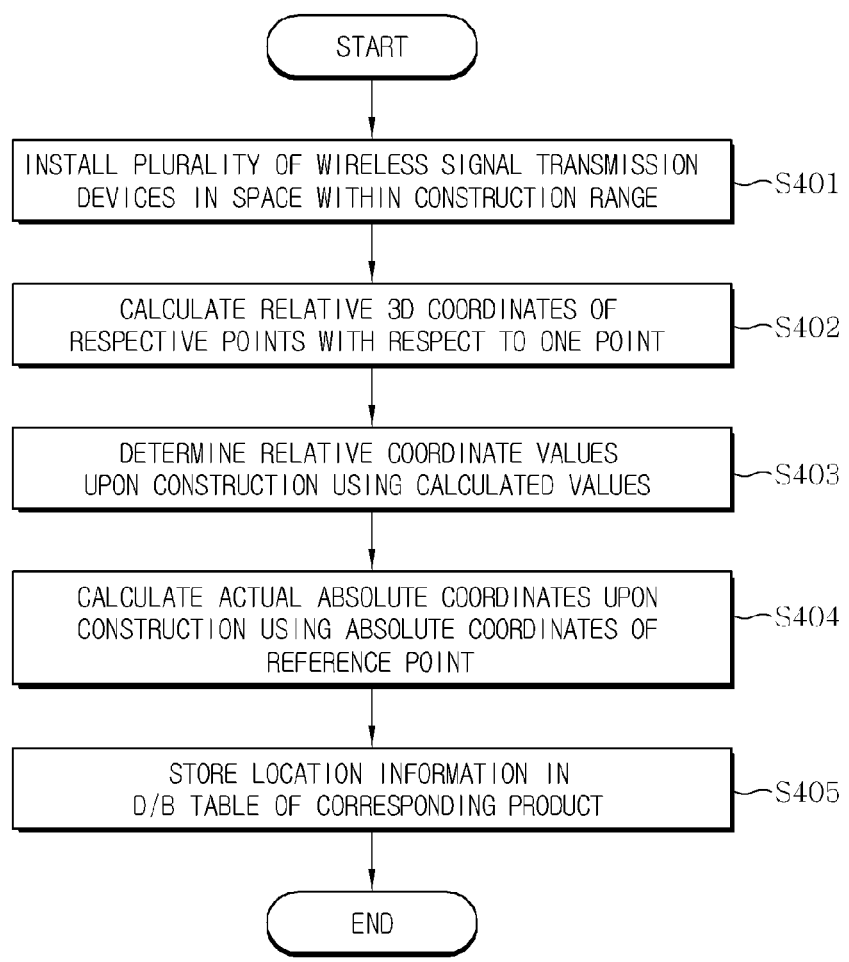
FIG. 4 is a flowchart illustrating a precise coordinate calculation procedure using a wireless local area network (LAN) according to an exemplary embodiment of the present invention.

FIG. 4 is a flowchart illustrating a precise coordinate calculation procedure using a wireless LAN according to an exemplary embodiment of the present invention. Referring to FIG. 4, a plurality of wireless signal transmission (or wireless LAN) devices are installed in a space within a construction range (S401), and then relative 3D coordinates of respective points are calculated with respect to one point (S402). After that, relative coordinate values of a construction location are determined using the calculated values (S403). Here, actual absolute coordinates upon construction are calculated using absolute coordinates of the reference point (S404), and it is possible to store accurate location information on the construction location in a D/B (S405).

More specifically, even when water and sewer pipelines are comprehensively managed as described above, due to technological limitations of the GPS, there are still drawbacks that an error range of the GPS should become practical, and it is impossible to use a height value (or a Z-coordinate value in a 3D space).

To solve these problems, a device for transmitting a wireless signal that can be used as a reference for location recognition by a wireless portable terminal is installed according to an exemplary embodiment of the present invention.

Then, after each device is installed in an appropriate space within a construction range, relative 3D coordinates of each point are measured and calculated with respect to one point, and relative coordinates upon construction are determined on the basis of the relative 3D coordinates. To this end, it is preferable for the construction range to be within a signal area of the device.

While it is theoretically possible to calculate 3D coordinates using three reference points, at least four devices are necessary in practice to reduce an error caused due to difference in transmission time of radio waves. In other words, each point should receive at least four signals.

Figure 9:
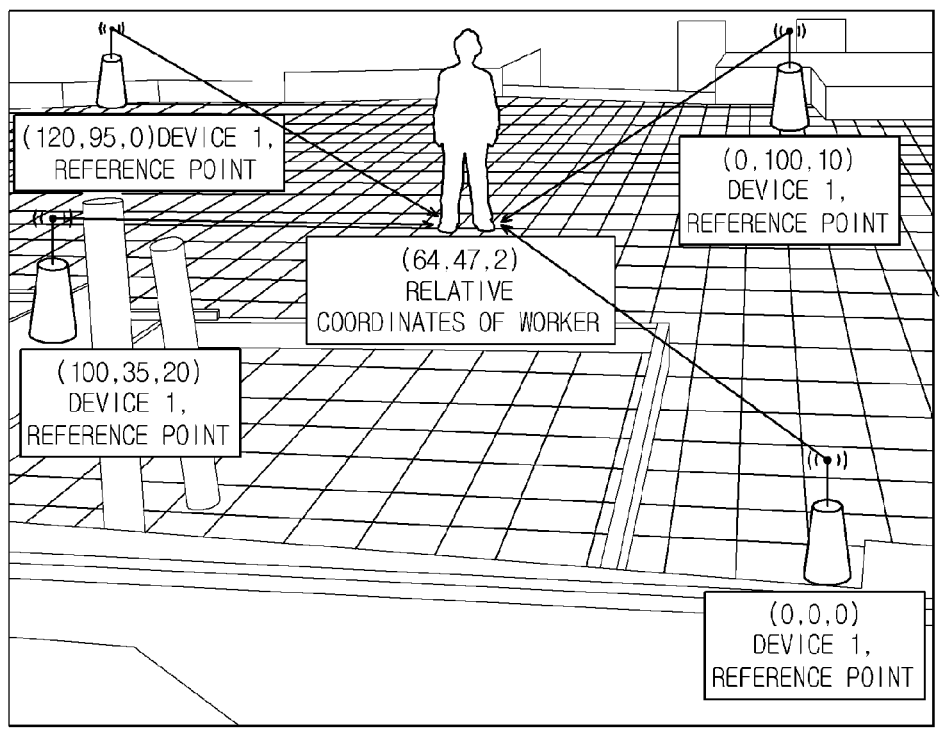
FIG. 9 is a diagram showing an example of precise surveying using a wireless LAN according to an exemplary embodiment of the present invention.

FIG. 9 is a diagram showing an example of precise surveying using a wireless LAN according to an exemplary embodiment of the present invention. Referring to FIG. 9, when four wireless LAN devices are installed within a construction range, relative 3D coordinates between the respective devices can be measured and calculated. For example, when coordinates of device 1 are set to (0, 0, 0) as a reference point, relative coordinates of device 2, device 3, and device 4 can be measured. In other words, relative coordinates of device 2, device 3, and device 4 are measured to be (0, 100, 10), (100, 35, 20), and (120, 95, 0), respectively. Accordingly, relative coordinates of a worker can be calculated to be (64, 47, 2).

By calculating absolute coordinates using the relative coordinates measured in this way, it is possible to provide accurate location information. More specifically, absolute coordinates upon construction calculated from the absolute coordinates (latitude and longitude) of the reference point, directions and distance values measured between the respective devices, and the previously measured relative coordinates are stored in a D/B table corresponding to a serial number of the corresponding product.

When information is requested from a D/B using a specific code, a product serial number, or location information, absolute coordinate values and relative coordinate values are provided together with a value corresponding to the requested information. At this time, precise absolute coordinate values determined in the above-described method are provided, so that accurate current location information and relative location information on all products buried near the corresponding location is displayed.

Since a GPS value of a general wireless terminal is not accurate, a movement displacement calculated using a device capable of sensing movement of a user, such as an accelerometer and an electronic compass embedded in the device, and relative coordinates are compared to calculate an accurate location of the user, and service is provided on the basis of the location.

In particular, 3D coordinates may be applied when augmented reality, virtual reality, or a 3D drawing is provided according to an exemplary embodiment of the present invention.

Figure 11:
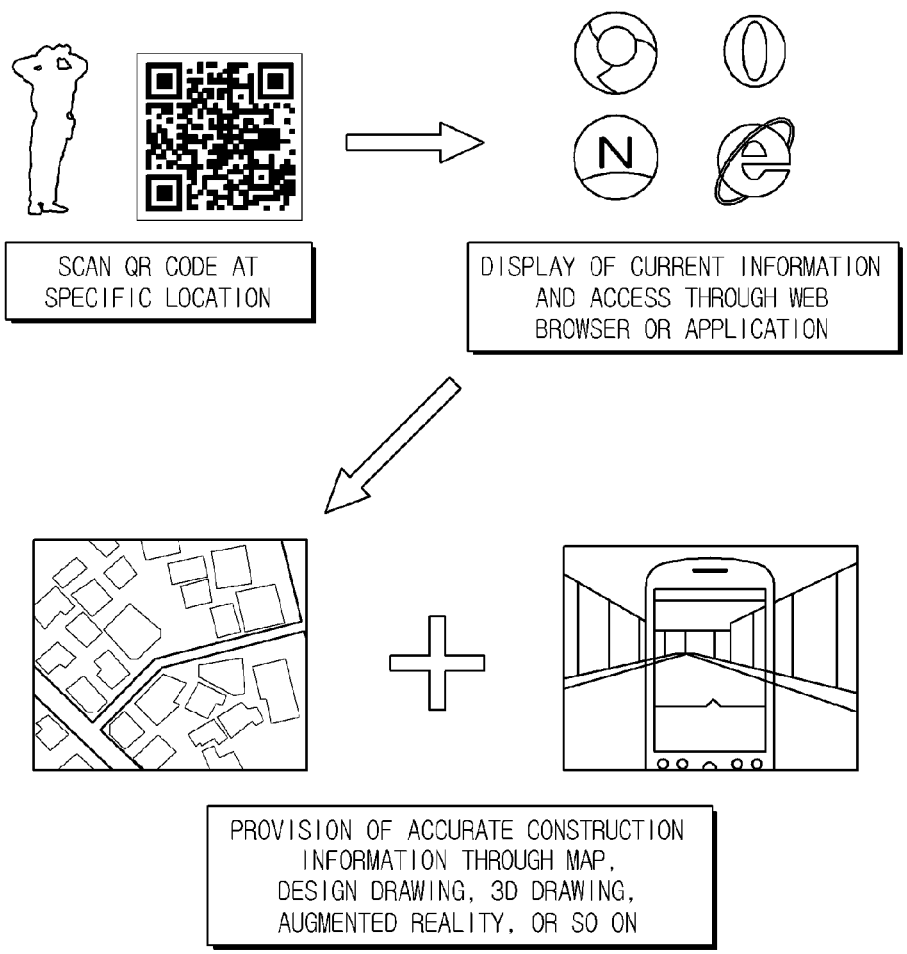
FIG. 11 is a diagram showing an example of code reading according to an exemplary embodiment of the present invention.

FIG. 11 is a diagram showing an example of code reading according to an exemplary embodiment of the present invention. Referring to FIG. 11, when a QR code attached to a product is scanned at a specific location as described above, current information is displayed, and access is gained through a web browser or an application. At this time, according to various exemplary embodiments of the present invention, accurate construction information is provided in connection with a map, a design map, a 3D drawing, augmented reality, or so on.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A comprehensive pipeline management system using an information recognition means, comprising:
   an integrated management server configured to generate an information recognition code using a serial number of a product related to water and sewer pipelines, and process storage and transmission of information related to the product and mapped to the information recognition code;
   an information recognition code printing terminal configured to print the information recognition code in a form attachable to the product;
   a user terminal configured to recognize the information recognition code from the product to which the information recognition code is attached, receive the product-related information mapped to the information recognition code from the integrated management server, output the received product-related information, generate location information and time information on the product received through a Global Positioning System (GPS) satellite, and transmit the generated location information and time information to the integrated management server;
   an authentication server configured to, when there is a request for information related to water and sewer pipelines from the user terminal to the integrated management server, authenticate authority of the user terminal; and
   a database (D/B) server configured to map and store the information recognition code and the product-related information, provide the stored information in response to the request for information on the product from the user terminal, and update and store the product-related information when the location information and the time information on the product is received from the integrated management server,
   wherein a dedicated application for interpreting the identified information recognition code and performing a function of requesting information from the corresponding linked uniform resource locator (URL) is installed in the user terminal,
   wherein an image of the product related to water and sewer pipelines and installed in the corresponding area is displayed as augmented reality to overlap an actual image taken through a camera included in the user terminal, and
   wherein the user terminal additionally displays the corresponding information recognition code generated for the product related to water and sewer pipelines on the augmented-reality image of the product, and displays the detailed information on the product stored in the D/B server when the displayed information recognition code is selected.

2. The comprehensive pipeline management system of claim 1, further comprising at least three wireless signal transmission devices installed in an area in which the product is buried,
   wherein the location information is generated by measuring and calculating three-dimensional (3D) coordinates of points at which the respective devices are installed with respect to one of the at least three wireless signal transmission devices, determining relative coordinate values of a construction point on the basis of the calculated 3D coordinates, and calculating actual absolute coordinates upon the construction from absolute coordinates of the wireless signal transmission device that is the reference and the calculated relative coordinate values.

3. The comprehensive pipeline management system of claim 2, wherein the target to which the information recognition code is attached is at least one selected from among a pipe, a pipe-related component, a manhole, a design drawing, and a major point.

4. The comprehensive pipeline management system of claim 2, wherein the information recognition code is at least one selected from among a barcode, a quick response (QR) code, a smart tag, a data matrix, and a color zone improvement plan (ZIP) code.

5. The comprehensive pipeline management system of claim 3, wherein the authority of the user terminal is differentially set according to an ordinary person, a builder, a designer, an inspector, and a sales manager.

6. The comprehensive pipeline management system of claim 1, wherein the target to which the information recognition code is attached is at least one selected from among a pipe, a pipe-related component, a manhole, a design drawing, and a major point.

7. The comprehensive pipeline management system of claim 1, wherein the information recognition code is at least one selected from among a barcode, a quick response (QR) code, a smart tag, a data matrix, and a color zone improvement plan (ZIP) code.

8. The comprehensive pipeline management system of claim 1, wherein the authority of the user terminal is differentially set according to an ordinary person, a builder, a designer, an inspector, and a sales manager.

9. A method of comprehensively managing pipelines using an integrated management server, a user terminal, an information recognition code printing terminal, and a database (D/B) server, the method comprising:
- a first step of generating, at the integrated management server, an information recognition code using identification information on a product related to water and sewer pipelines, information related to the product related to water and sewer pipelines being mapped to the information recognition code and present in the D/B server;
- a second step of printing, at the information recognition code printing terminal, the generated information recognition code in an attachable form, the printed information recognition code being attached to the water and sewer pipelines;
- a third step of recognizing the information recognition code attached to the water and sewer pipelines through the user terminal;
- a fourth step of generating and transmitting, at the user terminal, location information and time information on the product to the integrated management server; and
- a fifth step of receiving, at the D/B server, the location information and the time information on the product from the integrated management server, and updating the product-related information according to the received time information and time information,
- wherein the integrated management server authenticates authority of the user terminal and then transmits the product-related information to the user terminal after the third step or the fifth step,
- wherein a dedicated application for interpreting the identified information recognition code and performing a function of requesting information from the corresponding linked uniform resource locator (URL) is installed in the user terminal,
- wherein an image of the product related to water and sewer pipelines and installed in the corresponding area is displayed as augmented reality to overlap an actual image taken through a camera included in the user terminal,
- wherein the corresponding information recognition code generated for the product related to water and sewer pipelines is additionally displayed on the augmented-reality image of the product, and
- wherein the detailed information on the product stored in the D/B server is displayed when the displayed information recognition code is selected.

10. The method of claim 9, wherein the fourth step of generating the location information includes:
- a $4\text{-}1^{st}$ step of measuring and calculating three-dimensional (3D) coordinates of points at which at least three respective wireless signal transmission devices are installed in an area in which the product is buried, with respect to one of the at least three wireless signal transmission devices;
- a $4\text{-}2^{nd}$ step of determining relative coordinate values of a construction point on the basis of the calculated 3D coordinates; and
- a $4\text{-}3^{rd}$ step of calculating actual absolute coordinates upon the construction from absolute coordinates of the wireless signal transmission device that is the reference and the calculated relative coordinate values.

11. The method of claim 10, wherein the calculated 3D coordinates are applied to implementing augmented reality, virtual reality, or a 3D drawing.

12. The method of claim 10, wherein the target to which the information recognition code is attached is at least one selected from among a pipe, a pipe-related component, a manhole, a design drawing, and a major point.

13. The method of claim 10, wherein the information recognition code is at least one selected from among a barcode, a quick response (QR) code, a smart tag, a data matrix, and a color zone improvement plan (ZIP) code.

14. The method of claim 10, wherein the authority of the user terminal is differentially set according to an ordinary person, a builder, a designer, an inspector, and a sales manager.

15. The method of claim 9, wherein the target to which the information recognition code is attached is at least one selected from among a pipe, a pipe-related component, a manhole, a design drawing, and a major point.

16. The method of claim 9, wherein the information recognition code is at least one selected from among a barcode, a quick response (QR) code, a smart tag, a data matrix, and a color zone improvement plan (ZIP) code.

17. The method of claim 9, wherein the authority of the user terminal is differentially set according to an ordinary person, a builder, a designer, an inspector, and a sales manager.

* * * * *